Figure 1:
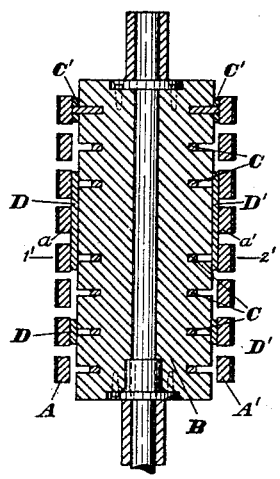

No. 650,119. Patented May 22, 1900.
E. J. WADE.
ELECTRICAL SWITCH.
(Application filed Mar. 8, 1900.)
(No Model.)

WITNESSES
A. M. Parkins
E. A. Balloch

INVENTOR
Edward John Wade,
By his Attorneys,
Baldwin, Davidson & Wight

UNITED STATES PATENT OFFICE.

EDWARD J. WADE, OF LONDON, ENGLAND.

ELECTRICAL SWITCH.

SPECIFICATION forming part of Letters Patent No. 650,119, dated May 22, 1900.

Application filed March 8, 1900. Serial No. 7,892. (No model.)

*To all whom it may concern:*

Be it known that I, EDWARD JOHN WADE, a subject of Her Majesty the Queen of Great Britain, residing at Streatham, London, in the county of Surrey, England, have invented new and useful Improvements in and Connected with Electrical Switches, of which the following is a specification.

My invention relates to improvements in those classes of electrical controller-switches which are used for coupling up storage-cells or other sources of electromotive force in various combinations of series and parallel, and is especially applicable in conjunction with switches of the type described in the specification of United States Patent No. 626,798, in which intermediate pass-over combinations are provided between the working combinations. All connections that have to be made in arranging the cell combinations are of two kinds—viz., the bridging together of the positive and negative terminals of cells to complete the series of cells and the joining together of positive terminals in sets and of negative terminals in sets to parallel the cells or series of cells. The usual method of carrying this out is to construct the switches with one row of fixed contact-pieces for all the necessary cell-terminals, both positive and negative, and to join these together, as required, by means of other contacts which are attached to and revolve with a cylindrical drum. This arrangement necessarily entails a number of cross connections being made between the drum-contacts or else a duplication of some of the battery-terminals.

The object of my invention is to enable the combinations to be effected with the minimum number of terminals, contact-pieces, and cross connections and in the smallest space, thereby reducing the size of the switch and the cost of its manufacture. For this purpose I provide two rows of fixed contact-pieces facing each other at opposite sides of a drum, one row for all the positive cell connections and the other row for all the negative cell connections. The fixed contacts directly opposed to each other on either side of the drum are connected pair by pair to the positive and negative terminals, respectively, of adjacent battery-cells, and the end positive and negative of the battery are also connected to a corresponding pair of contacts.

The term "adjacent" as used in this specification does not necessarily imply cells or terminals which are in mechanical juxtaposition to each other, (although for convenience sake this is mostly the case,) but indicates those which require to be in immediate connection electrically.

By this device all the connections for paralleling the cells can be effected by metallic contact-pieces which run lengthwise of the drum and all the bridging connections for completing the series of cells by transverse pieces which pass around the drum circumferentially, a separate transverse strip or ring being provided for each pair of fixed contacts, except for the pair to be connected to the end positive and negative terminals of the battery. To prevent the lengthwise connecting-pieces and the transverse connecting-piece from touching each other, the former may preferably be fixed to the surface of the drum and the latter let into annular grooves of sufficient depth so as to pass clear underneath, the said lengthwise connecting-pieces only projecting up to or above the surface at those points where they have to engage with the fixed contacts.

Figure 2:
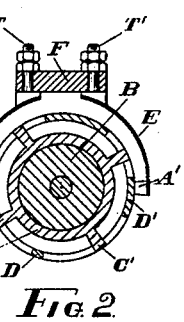
Figure 3:
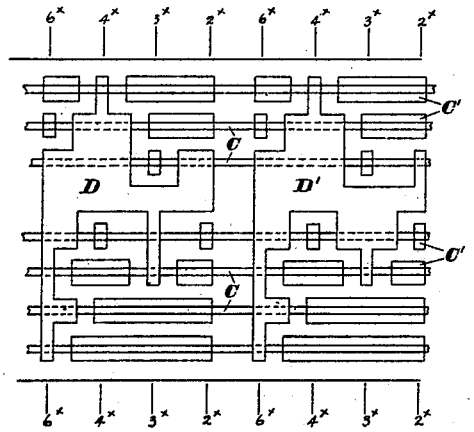
Figure 4:
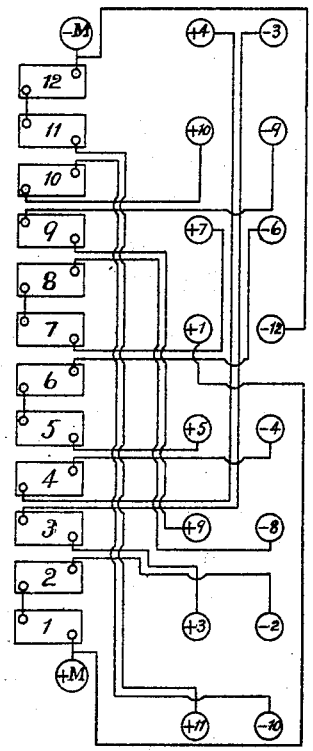
Figures 5, 6, 7, 8:
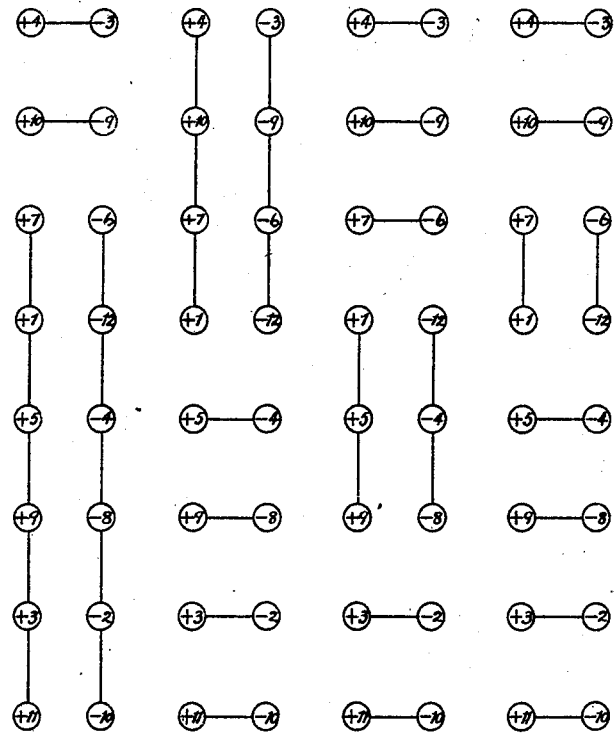

In the accompanying drawings, which illustrate my invention, and in all the figures of which like letters refer to like parts, Figure 1 is a sectional plan through the drum and fixed contacts. Fig. 2 is a transverse section on the line 1' 2' of Fig. 1. Fig. 3 is a developed plan of the surface of the drum. Fig. 4 is a diagram showing the connections between the storage-cells or other sources of electromotive force and the fixed contacts or their corresponding terminals; and Figs. 5, 6, 7, and 8 are diagrams showing what connections are made between the fixed contacts by means of the contact-pieces on the drum when putting the cells in 6, 4, 3, and 2 parallels, respectively.

A A' are two rows of fixed contact-pieces at diametrically-opposite sides of a rotatable drum B. Metallic pieces or rings C, suitably insulated from each other, pass around the drum, a ring being provided for each pair of opposing contacts, except for the pair $a$ $a'$, to which the end terminals of the battery are to be connected. For convenience of construction these rings may, if desired, be made up of two or more segments in proper metallic connection, and they need not necessarily entirely encircle the drum. Each ring engages with the pair of opposing contacts and puts them in metallic connection by means of portions C', which are raised or project out at certain parts, according to the combination it is desired to effect. Other metallic pieces D D' for putting any required number of contacts in the same row in connection with each other run lengthwise of the drum. The piece or pieces which engage with one row of contacts must be insulated from the piece or pieces which engage with the other row of contacts, and both or all of them must be insulated from the ring-contacts above described.

According to the method shown in the drawings the ring-contacts C are sunk into circumferential grooves beneath the surface of the drum, which is composed of hard wood or other suitable insulating material, and project up to or above its surface, as at C', where they have to engage with the fixed contacts. The other contact-pieces D D' are fixed to the surface of the drum and pass over the ring-contacts in the grooves without touching them.

The fixed contact-pieces A A' (shown in Fig. 2) are blocks of metal attached to the ends of metallic strips or springs E. These springs are curved to correspond with the periphery of the drum B and are attached to two rows of terminals T T', mounted on a strip of insulating material F or otherwise suitably insulated.

The outer casing or the base and brackets which support the bearings in which the drum-spindle revolves and by which the terminal board is carried are not shown in the drawings nor the means of rotating the drum. All these may be of any ordinary or suitable construction.

Fig. 4 shows, diagrammatically, twelve storage-cells or sets of storage-cells or other sources of electromotive force connected to the terminals of the two rows of fixed contact-pieces. The two terminals $+ M$ and $- M$ are the main terminals to which the motor or main circuit is to be connected. These connections and the arrangement of contact-pieces on the drum shown in Fig. 3 are for coupling the cells or other sources of electromotive force in six, four, three, and two parallels, respectively, together with suitable pass-over combinations between these working combinations, as described in the specification of the prior patent above alluded to.

Figs. 5, 6, 7, and 8 show, diagrammatically, which of the terminals of the controller are connected internally by means of the fixed contacts and drum-contacts to give the said four working combinations, respectively, and the portions of the drum-contacts which are then engaged with the fixed contacts are indicated in Fig. 3 by the perpendicular lines numbered $6^\times$, $4^\times$, $3^\times$, and $2^\times$, respectively. It will be understood that this special set of combinations is only shown for illustrative purposes.

The contacts can be arranged to give other combinations and sets of combinations and even for any given combination or set of combinations may sometimes be arranged in more ways than one without in any degree departing from the essence of my invention. The number of drum-contacts, fixed contacts, terminals, and connections to the storage-cells or other sources of electromotive force will also vary according to the combinations required.

What I claim, and desire to secure by Letters Patent of the United States, is—

1. The combination, in an electrical controller-switch, of two distinct sets or rows of contact-pieces connected to the storage-cells or other sources of electromotive force, two other contact-pieces or sets of contact-pieces adapted to put any requisite number of those in the two first-named sets or rows in metallic connection, each row among themselves, and further contact-pieces insulated from the second-named contact-pieces and acting at the same time to put pairs of opposing or corresponding contacts, one in each of the two first-named sets or rows, in metallic connection: the one series of contacts being movable relatively to the other series substantially as set forth.

2. In combination, in an electrical controller-switch, a rotatable drum, a set or row of metallic contact pieces or rings located transversely on said drum, two other contact-pieces or sets of contact-pieces mounted lengthwise on said drum, and two distinct sets or rows of contact-pieces located at diametrically-opposite sides of said drum and connected to the storage-cells or other sources of electromotive force; the two first-named sets or rows of contact-pieces making contact with the last-mentioned sets or rows of contact-pieces and the one series of contacts being movable relatively to the other series substantially as set forth.

3. In an electrical controller-switch, the combination of a movable member, a set or row of metallic contact pieces or strips located transversely thereon, other contact-pieces or sets of contact-pieces mounted lengthwise thereon and insulated from the first-named contact-pieces, and two distinct sets or rows of contact-pieces located opposite the face of said movable member in operative relation to the contacts thereon and connected to storage-cells or other sources of electromotive force, substantially as and for the purpose set forth.

In testimony whereof I have hereunto subscribed my name.

EDWARD J. WADE.

Witnesses:
A. F. SPOONER,
J. S. WITHERS.